US006109326A

United States Patent [19]

Leakey et al.

[11] Patent Number: 6,109,326

[45] Date of Patent: Aug. 29, 2000

[54] EMBOSSER FOR PRODUCING TWO-PLY PAPER PRODUCTS WITH EITHER NESTED OR FOOT-TO-FOOT EMBOSSMENTS

[75] Inventors: Malcolm R. Leakey, Plymouth, United Kingdom; Michael J. Baeten, Green Bay, Wis.

[73] Assignee: Paper Converting Machine Company, Green Bay, Wis.

[21] Appl. No.: 09/137,634

[22] Filed: Aug. 20, 1998

[51] Int. Cl.[7] .......... B32B 31/04

[52] U.S. Cl. .......... 156/553; 156/209; 156/219; 156/555; 156/582

[58] Field of Search .......... 156/209, 219, 156/292, 470, 553, 555, 582

[56] References Cited

U.S. PATENT DOCUMENTS

| | | | |
|---|---|---|---|
| 2,834,809 | 5/1958 | Schutte | 162/117 |
| 3,414,459 | 12/1968 | Wells | 428/180 |
| 3,556,907 | 1/1971 | Nystrand | 156/470 |
| 3,867,225 | 2/1975 | Nystrand | 156/209 |
| 4,325,768 | 4/1982 | Schulz | 156/206 |
| 4,339,088 | 7/1982 | Niedermeyer | 242/160.4 |
| 4,483,728 | 11/1984 | Bauernfeind | 156/209 |
| 4,671,983 | 6/1987 | Burt | 428/179 |
| 5,173,351 | 12/1992 | Ruppel | 428/174 |
| 5,339,730 | 8/1994 | Ruppel et al. | 101/32 |
| 5,686,168 | 11/1997 | Laurent et al. | 428/179 |
| 5,736,223 | 4/1998 | Laurent | 428/154 |

*Primary Examiner*—James Sells

[57] ABSTRACT

An embosser can emboss two webs of sheet material with either nested or foot-to-foot embossments. The embosser includes two steel embossing rolls which are engraved with the same embossing pattern. When foot-to-foot embossments are desired, the embossing rolls are positioned so that the corresponding embossments on the two rolls are aligned. When nested embossed are desired, one of the embossing rolls is moved either axially or circumferentially, or both, relative to the other embossing roll so that embossments on the two rolls nest.

17 Claims, 10 Drawing Sheets

168
172
166
148
167
170
139
140
142
132
143
141
138
169
173
165
164
171
144
151
135
146
130
94
95
147
150
134
131
152
149
133
136
137

EMBOSSER FOR PRODUCING TWO-PLY PAPER PRODUCTS WITH EITHER NESTED OR FOOT-TO-FOOT EMBOSSMENTS

BACKGROUND

This invention relates to embossed two-ply paper products such as paper towels and bathroom tissue. More particularly, the invention relates to a embossing machine which can form embossments in either a nested or a foot-to-foot configuration.

Paper products such as paper towels and bathroom tissue are often formed from two plies of paper sheet material or webs. Such products are commonly formed on a rewinder line in which jumbo rolls of webs are unwound, perforated, and rewound into retail sized rolls. Many rewinder lines include an embosser for forming embossments in one or both of the webs.

When both webs are embossed, the embossments can be arranged in either a foot-to-foot configuration or in a nested configuration. U.S. Pat. No. 3,414,459 describes a foot-to-foot configuration. The embossments or projections of one of the webs are aligned with the embossments of the other web, and the embossments are typically glued together to form a laminated two-ply product.

U.S. Pat. Nos. 3,556,907 and 3,867,225 describe a nested embossed configuration. The embossments of one of the webs are positioned between the embossments of the other web so that the embossments of the two webs do not contact each other. Again, the webs are typically glued together.

Some manufacturers of paper products believe that both nested and foot-to-foot embossed products have certain advantages, and such manufacturers may make both nested and foot-to-foot products. However, different embossment patterns are generally used for nested and foot-to-foot products. Further, some nested products have a different embossment pattern for each ply.

Most embossing machines are dedicated machines which are configured to produce either nested embossments or foot-to-foot embossments but not both. Recently, some embossing machines have been produced which have the capability of being reconfigured in order to change from nested embossments to foot-to-foot embossments or vice versa. However, such reconfiguring requires substantial machine downtime and substantial labor. When the machine is reconfigured, the embossing rolls are changed because different embossing patterns are used.

Co-owned and co-pending United States patent application entitled "TWO-PLY PAPER PRODUCTS WITH EITHER NESTED OR FOOT-TO-FOOT EMBOSSMENTS AND METHOD OF MAKING," Ser. No. 09/134,694, filed August 14, 1998, describes embossing patterns which can be used to produce either nested or foot-to-foot embossments. The same embossing pattern is engraved on both embossing rolls, and the same embossing rolls can be used to produce both nested and foot-to-foot embossments.

SUMMARY OF THE INVENTION

The invention provides a combination embosser which includes two embossing rolls which can be easily adjusted to produce either nested or foot-to-foot embossments without changing the embossing rolls and without requiring excessive downtime. One of the embossing rolls is rotatably mounted in a fixed position in the embosser. The fixed position of the roll facilitates connecting the roll to the rotary drive mechanism and applying adhesive to the web which wraps the roll. The second embossing roll is mounted for both axial and circumferential adjustment relative to the first roll. The second roll is rotated by gears which are mounted on the two rolls so that the second roll rotates with the first roll. The position of the gear on the second roll can be adjusted relative to the second roll to adjust the relative circumferential positions of the two rolls. When the axial position of the second roll is adjusted, the gear on the second roll moves axially with respect to the gear on the first roll. The embosser can therefore be quickly and easily changed to produce either nested or foot-to-foot embossments.

DESCRIPTION OF THE DRAWING

The invention will be explained in conjunction with illustrative embodiments shown in the accompanying drawing, in which.

DESCRIPTION OF THE SPECIFIC EMBODIMENTS

Figure 1:
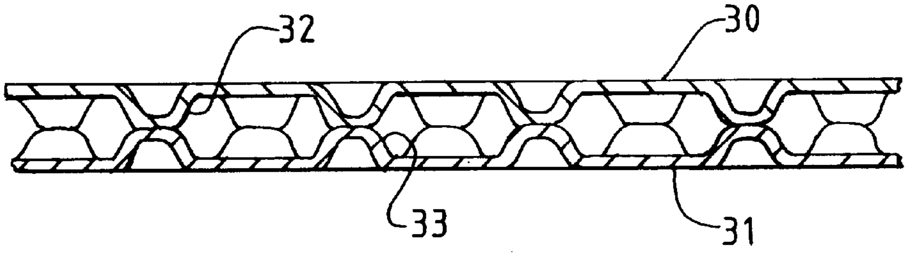
FIG. 1 illustrates a typical prior art two-ply embossed paper product in which the embossments are arranged in a foot-to-foot configuration.

FIG. 1 illustrates a conventional two-ply foot-to-foot embossed paper product such as kitchen toweling. The foot-to-foot embossed product of FIG. 1 can be formed, for example, in accordance with U.S. Pat. No. 3,414,459. The product includes upper and lower plies 30 and 31 of paper sheet material. The upper ply is formed with downwardly projecting embossments 32, and the lower ply is formed with upwardly projecting embossments 33. The embossments contact each other, and adhesive is advantageously applied to the embossments of one of the plies so that the two plies are adhesively secured together.

Figure 2:
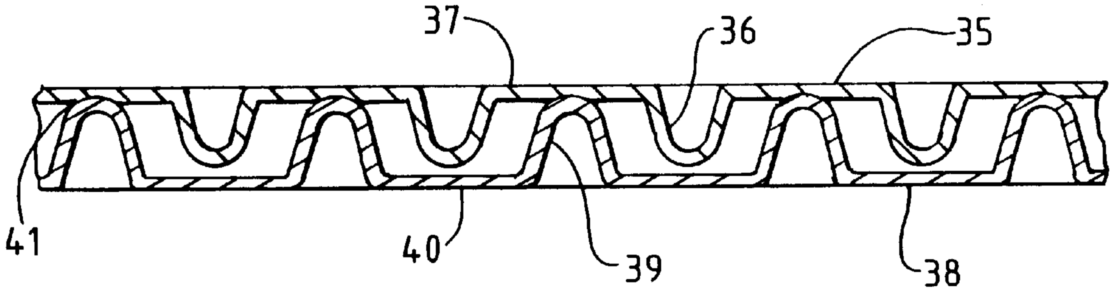
FIG. 2 illustrates a prior art two-ply embossed paper product in which the embossments are arranged in a nested configuration.

FIG. 2 illustrates a conventional two-ply paper product with nested embossments which can be formed in accordance with U.S. Pat. Nos. 3,556,907 and 3,867,225. An upper ply 35 of paper sheet material is provided with downwardly projecting embossments 36 and unembossed areas 37 between the embossments. A lower ply 38 of paper sheet material is provided with upwardly extending embossments 39 and unembossed areas 40 between the embossments. The two plies are arranged so that the embossments of one ply extend into the spaces between the embossments of the other ply. Adhesive 41 is applied to the embossments 39 of the lower ply for adhesively securing the embossments 39 to the unembossed areas 37 of the upper ply.

Figure 3:
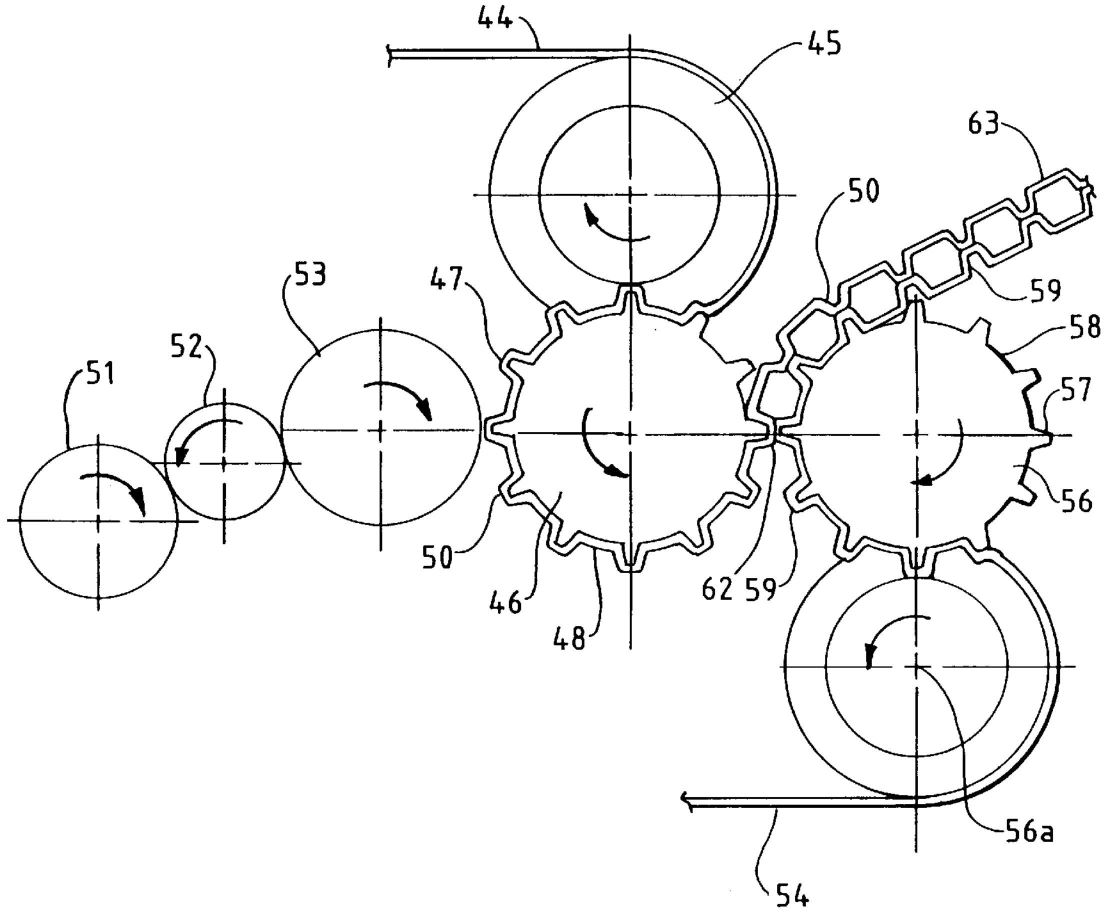
FIG. 3 is a schematic side view of a prior art embossing machine for producing foot-to-foot embossments.

FIG. 3 illustrates a conventional embossing machine for producing two-ply paper products with foot-to-foot embossments. A top web 44 which is unwound from an unwind stand (not shown) passes over an upper rubber-covered roll 45 and a steel embossing roll 46. The embossing roll is engraved to provide embossments or radially outwardly extending projections 47 and unembossed areas 48 between the projections.

The embossing roll 46 is rotatably mounted in the embossing machine, and as the embossing roll 46 and the rubber covered roll 45 rotate, projections 47 on the embossing roll 46 press the upper web into the rubber-covered roll 45 and form embossments 50 on the upper web. Adhesive or glue is picked up from an adhesive fountain (not shown) by a transfer roll 51, and the glue is transferred by transfer roll 52 to an applicator roll 53. The applicator roll 53 contacts the embossments 50 of the upper web and transfers glue to the embossments.

A lower web 54 is unwound from another unwind stand and passes over a lower rubber-covered roll 55 and a second steel embossing roll 56. The embossing roll 56 is also provided with embossments or projections 57 and unembossed areas 58. The projections 57 on the second embossing roll press the lower web into the rubber-covered roll 55 and form embossments 59 on the lower web.

The two embossing rolls are arranged so that the embossments of the two webs are aligned and are pressed together where the projections of the embossing rollers meet at the nip 62 between the embossing rolls. As the embossments of the webs are pressed together, the adhesive on one of the embossments 50 secures the two plies together. The resulting laminated two-ply embossed product 63 advances away from the embossing machine for further processing operations, for example, in a rewinder line.

The second embossing roll 56 is rotatably mounted in the embossing machine. The second embossing roll is also advantageously pivotable relative to the first embossing roll 46 so that the nip 62 can be adjusted. The rotational or longitudinal axes 46*a* and 56*a* of the embossing rolls are parallel.

Figure 4:
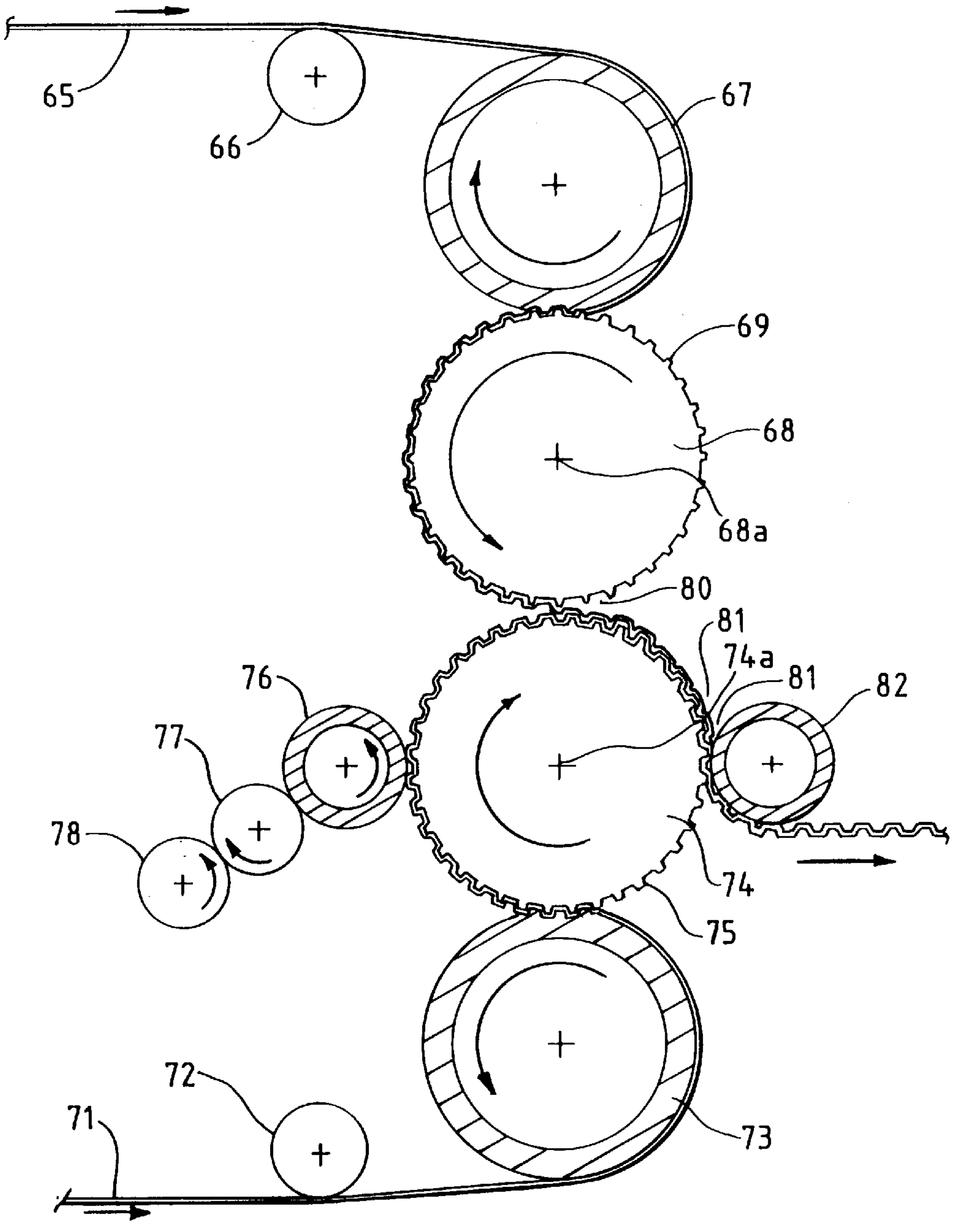
FIG. 4 is a schematic side view of an embossing machine for producing nested embossments.

FIG. 4 illustrates a conventional embossing machine for producing two-ply paper products with nested embossments. An upper web 65 from an unwind stand advances over a bowed roll 66 and around an upper rubber-covered roll 67. An upper embossing roll 68 having projections or embossments 69 presses the upper web into the rubber-covered roll 67 to form embossments in the upper web.

A lower web 71 is advanced from another unwind stand over a bowed roll 72 and around a lower rubber-covered roll 73. A lower embossing roll 74 having projections or embossments 75 presses the lower web into the rubber-covered roll 73 to form embossments in the lower web.

Adhesive is applied to the embossments of the lower web by an adhesive-applying roll 76 which is supplied with adhesive by transfer rolls 77 and 78 and a fountain (not shown).

The axes of rotation 68*a* and 74*a* of the upper and lower embossing rolls are parallel, and the rolls are separated to provide an open nip 80. The projections 69 on the upper embossing roll are offset from the projections 75 on the lower embossing roll so that the projections of the two embossing rolls mesh at the nip 80. The embossed upper web 65 leaves the upper embossing roll 68 at the nip 80 and meshes with the embossed lower web 71 on the lower embossing roll. The two webs are pressed together at a nip 81 between a rubber-covered marrying roll 82 and the lower embossing roll 74, and the adhesive on the embossments of the lower web is pressed against unembossed areas of the upper web to secure the two webs together.

Figure 5:
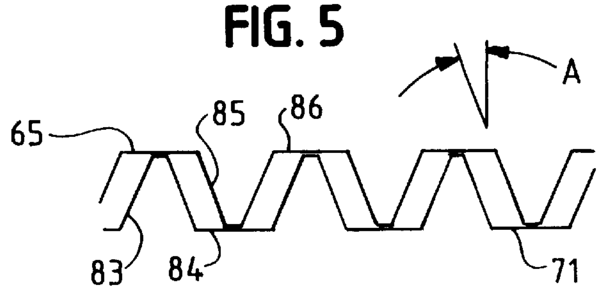
FIG. 5 is an enlarged cross sectional view of the nested embossments produced by the machine of FIG. 4.

FIG. 5 illustrates the laminated two-ply nested embossed product as it is advanced from the marrying roll. The lower web 71 includes upwardly extending embossments 83 and non-embossed areas 84. The upper web 65 includes downwardly extending embossments 85 and non-embossed areas 86. The embossments of each web are positioned in the unembossed areas of the other web, and the glue on the embossments 83 secures the embossments to the unembossed areas 86 of the upper web.

Figure 7:
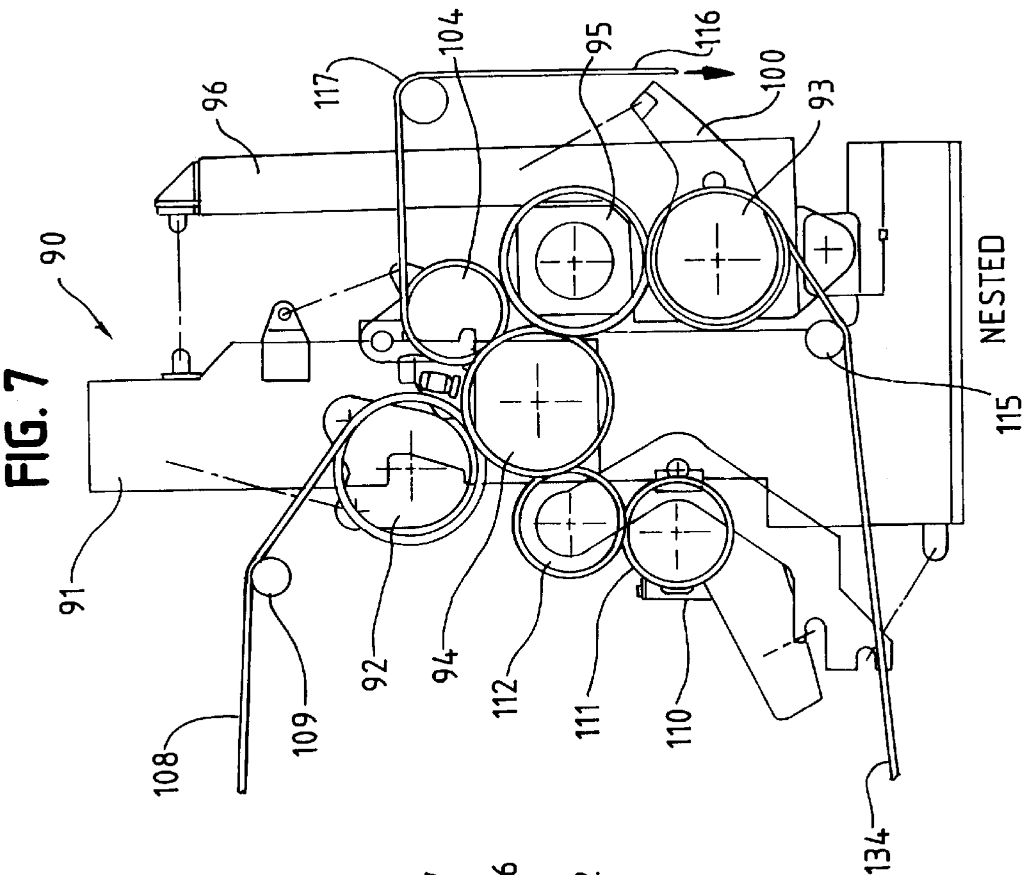
FIGS. 6 and 7 are schematic side views of a combination embossing machine in accordance with the invention which can produce both foot-to-foot and nested embossments.
Figure 6:
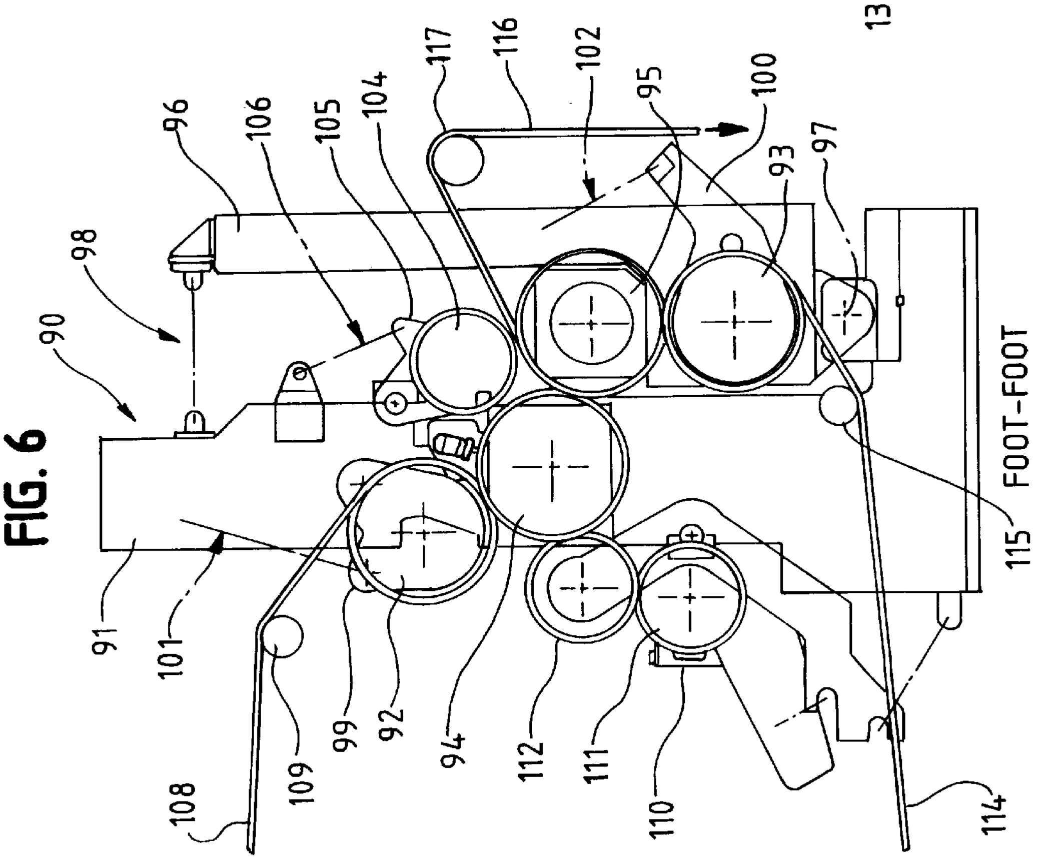

FIGS. 3 and 4 illustrate two different dedicated embossing machines for making foot-to-foot and nested embossments. Referring to FIGS. 6 and 7, a combination embossing machine 90 includes a frame 91 on which are rotatably mounted first and second rubber-covered rolls 92 and 93 and first and second steel embossing rolls 94 and 95. The embossing roll 94 is rotatably mounted in the frame in a fixed position so that its axis of rotation does not move. The rubber-covered roll 93 and the embossing roll 95 are mounted on a pivot arm 96 which pivots at pivot point 97 on the frame so that the distance between the fixed embossing roll 94 and the pivoting embossing roll 95 can be adjusted. Pivoting movement of the pivot arm is controlled by a hydraulic piston and cylinder assembly 98.

The rubber-covered rolls 92 and 93 are also mounted on pivot arms 99 and 100, and the positions of the rolls 92 and 93 can be adjusted by piston and cylinder assemblies 101 and 102. The pivot arm 100 is mounted on the pivot arm 96.

A marrying roll 104 is pivotally mounted on the frame by a pivot arm 105 for pivoting movement toward and away from the fixed embossing roll 94. The position of the marrying roll is controlled by a piston and cylinder assembly 106.

A first web 108 travels over roll 109 and around the first rubber-covered roll 92 and the fixed embossing roll 94. Adhesive is applied to the first web by an enclosed fountain 110, anilox roll 111, and applicator roll 112.

A second web 114 travels over a roll 115 and around the second rubber-covered roll 93 and pivoting embossing roll 95.

FIG. 6 illustrates the combination embosser configured to produce foot-to-foot embossments. The marrying roll 104 is pivoted away from the fixed embossing roll 94. Both of the embossing rolls 94 and 95 have the same embossing pattern, and the embossments of the two rolls are aligned so that the embossments on the two webs are pressed together in the nip between the two embossing rolls. The laminated two-ply product 116 extends from the pivoting embossing roll 95 and over a roll 117.

FIG. 7 illustrates the combination embosser configured to produce nested embossments. The relative positions of the two embossing rolls are adjusted so that the embossments of the rolls mesh. The marrying roll 104 is pivoted against the fixed embossing roll 94 to press the two webs together. The adhesive on the embossments of the web 108 secures the two webs together. The laminated two-ply sheet 116 travels from the marrying roll 104 over the roll 117.

Figure 14:
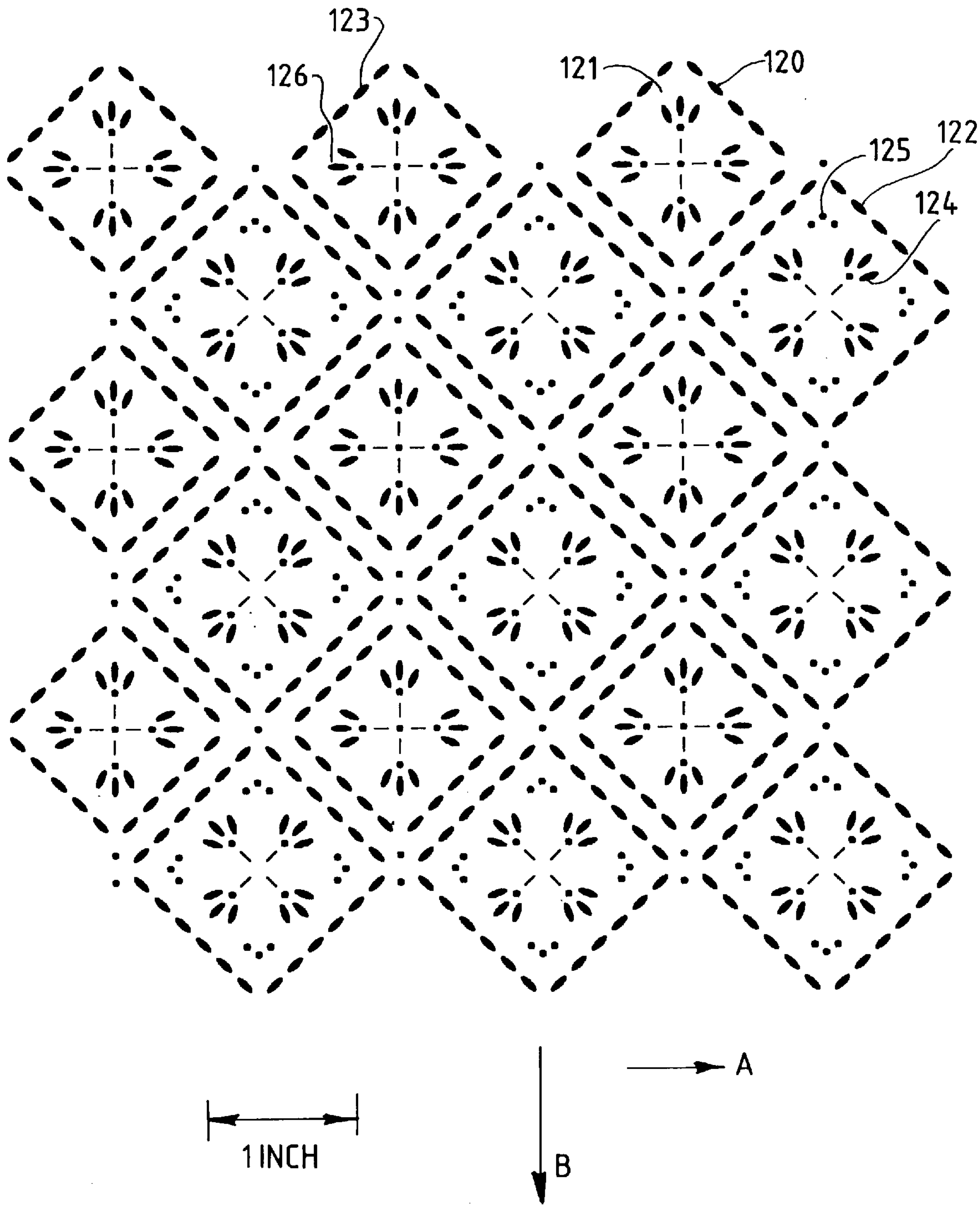
FIG. 14 is a plan view of an embossing pattern which can be used to produce both foot-to-foot and nested embossments.

FIG. 14 illustrates one of the embossing patterns which is described in the co-owned and co-pending United States patent application entitled "TWO-PLY PAPER PRODUCTS WITH EITHER NESTED OR FOOT-TO-FOOT EMBOSSMENTS AND METHOD OF MAKING," Ser. No. 09/134,694, filed Aug. 14, 1998. The embossing pattern can be engraved on both embossing rolls for use in either a foot-to-foot embossing machine, a nested embossing machine, or the combination embosser 90 of FIGS. 6 and 7. The same embossing pattern is used on each embossing roll.

The arrow A indicates the machine direction, i.e., the direction in which the web advances over the embossing roll and through the embossing machine. The arrow B indicates the cross-machine direction which extends parallel to the rotational axis of the embossing roll.

The embossing pattern includes embossments which are represented by black marks 120. The unmarked areas 121 which surround the embossments are unembossed areas. The embossing pattern includes a large decorative rectangular design 122 and a small rectangular design 123. Each large rectangle encloses an inner floral design 124 and a dot design 125 in each corner. Each small rectangle encloses a floral design 125. Each of the rectangular designs repeats in both the machine direction A and the cross-machine direction B.

When the embossing pattern of FIG. 14 is used to produce foot-to-foot embossments, the two embossing rolls are positioned so that the identical embossing patterns on the two rolls are aligned, i.e., each of the projections or embossments on one of the embossing rolls is aligned with a correspondingly shaped projection or embossment on the other embossing roll. The embossing rolls will therefore produce two embossed webs having the embossing pattern of FIG. 14 in which the embossing patterns are aligned and superimposed.

Figure 15:
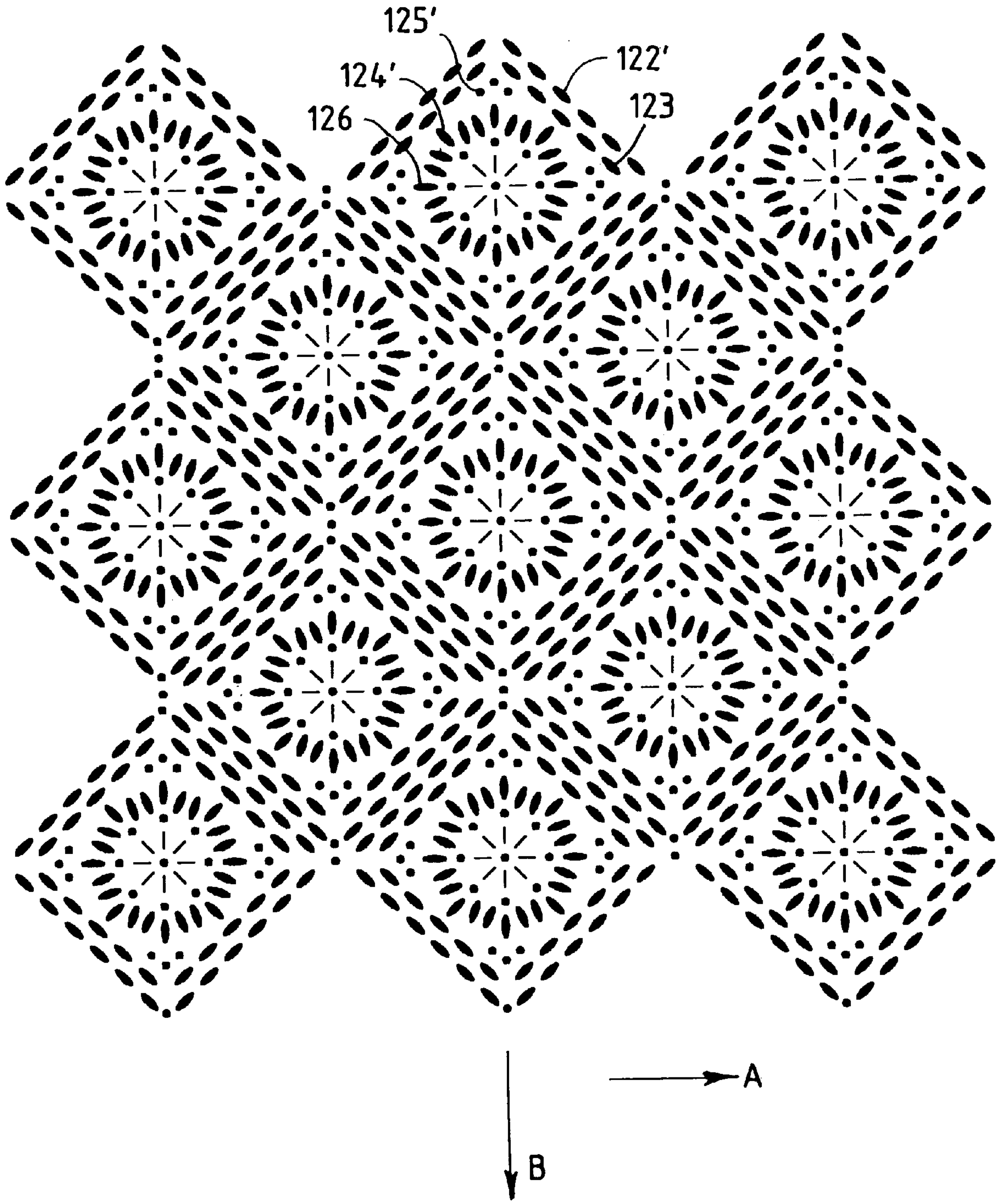
FIG. 15 is a plan view of two webs which have been embossed with the pattern of FIG. 14, one of the webs being shifted in both the machine direction and the cross-machine direction so that the embossments of the two webs are nested.

FIG. 15 illustrates how the embossing pattern of FIG. 14 can be used to produce nested embossments. One of the embossing rolls is both rotated slightly and shifted axially slightly relative to the other embossing roll so that the embossing pattern of one web is shifted in both the machine direction and in the cross-machine direction, i.e., the embossing pattern of one web is shifted generally diagonally relative to the embossing pattern of the other web.

In the nested configuration illustrated in FIG. 15, the small rectangular design 123 of one web is positioned inside of the large rectangle 122' of the other web. The dot design 125' of the second web is located inside of the corners of the small rectangle 123 of the first web. The floral design 126 of the first web and the floral design 124' of the second web mesh with each other so that the individual embossments of each of the floral designs are aligned with unembossed areas of the other floral design.

The patterns illustrated in FIGS. 14 and 15 are drawn to scale on the original drawings of this patent application. Since the drawings of the printed patent may be reduced, a one inch scale is included in FIG. 14. In FIG. 15, the embossments of one pattern is shifted about $^{29}/_{32}$ inch in the machine direction A and about $^{29}/_{32}$ inch in the cross-machine direction B.

FIGS. 8–13 illustrate the novel manner of mounting the two embossing rolls 94 and 95 in accordance with this invention.

Figure 8:
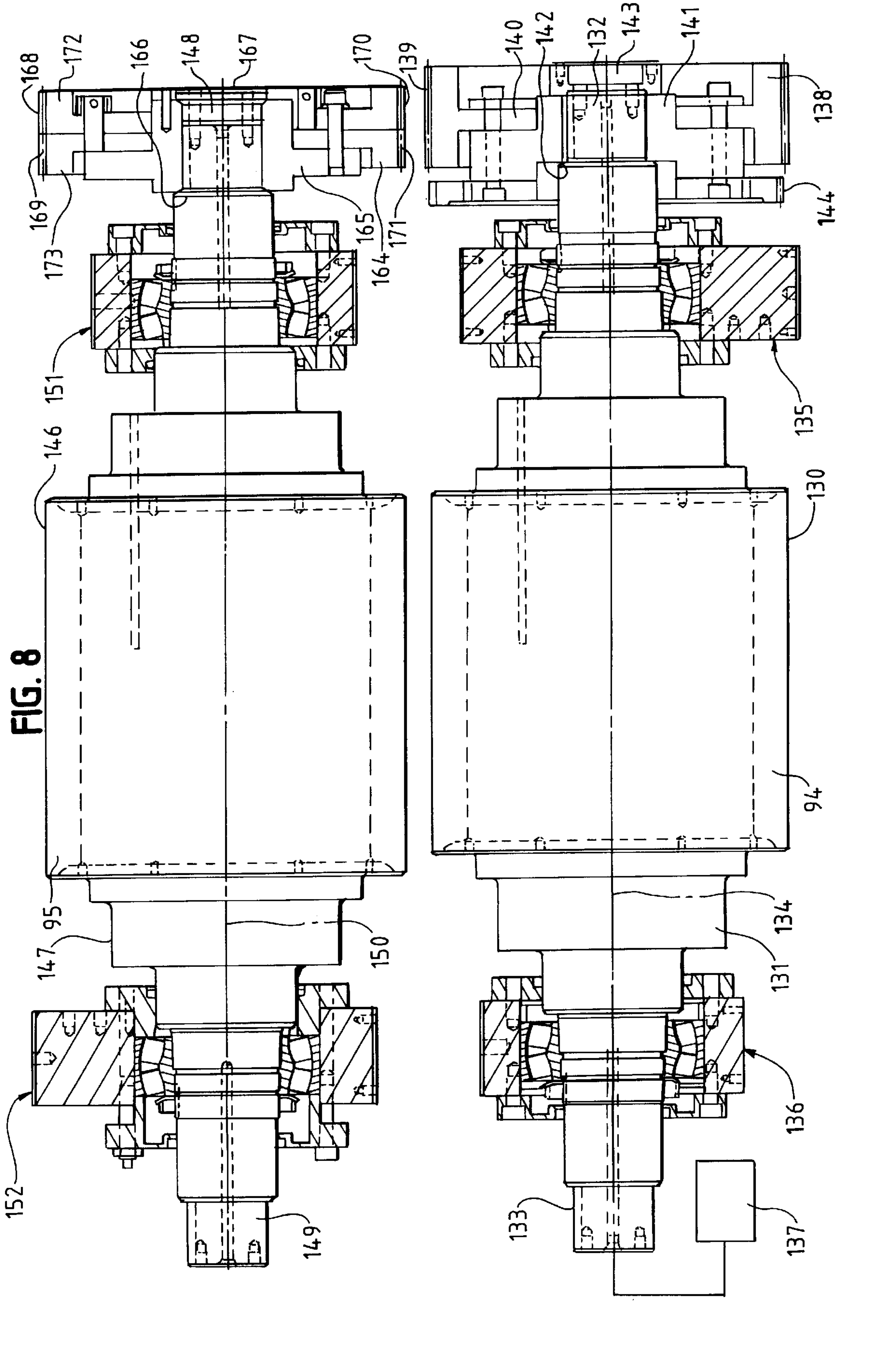
FIG. 8 is a top plan view of the two embossing rolls of the combination embossing machine.

Referring first to FIG. 8, the fixed embossing roll 94 includes an engraved steel embossing surface 130 and an axially extending shaft 131 having right and left ends 132 and 133 and a rotational axis 134. The right and left ends of the shaft are rotatably supported by conventional bearing assemblies 135 and 136 which are mounted on the frame 91 of the embosser 90. The embossing roll 94 is rotated by a suitable input drive connection 137 which is connected to the left end 133 of the shaft.

A gear 138 is mounted on the right end 132 of the shaft 131. The gear includes gear teeth 139 which extend circumferentially around the gear and a radially inwardly extending annular flange 140. The flange 140 is bolted to a hub 141 which is mounted on the shaft for rotation therewith. The hub engages a shoulder 142 on the shaft, and an end cap 143 is bolted to the end of the shaft. A gear 144 drives the adhesive applicator roll 112.

The pivoting embossing roll 95 includes an engraved steel embossing surface 146 and an axially extending shaft 147 having right and left ends 148 and 149 and a rotational axis 150. The right and left ends of the shaft are rotatably supported by bearing assemblies 151 and 152 which are mounted on the pivoting arm 96 of the frame 91. The axis 150 of the pivoting embossing roll 95 is parallel to the axis 134 of the fixed embossing roll 94.

Figure 9:
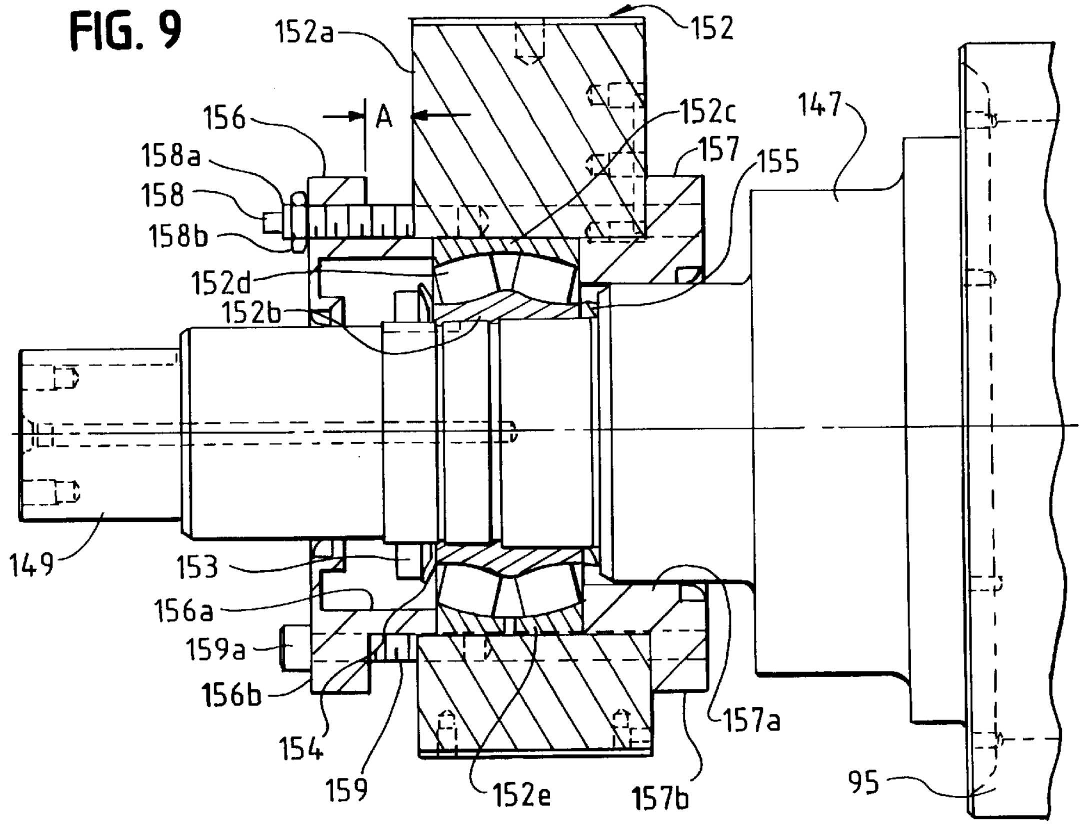
FIG. 9 is an enlarged fragmentary view of the left bearing assembly of the pivoting embossing roll of FIG. 8.

The bearing assemblies 151 and 152 are designed to permit substantial axial adjustment of the pivoting embossing roll 95 relative to the fixed embossing roll 94. Referring to FIG. 9, the left bearing assembly 152 includes a bearing housing **152*a* and inner and outer races 152*b* and 152*c* which enclose bearings 152*d*. The bearing housing is secured to the pivot arm 96** of the frame.

The inner race **152*b* has a conical inside surface which engages a conical surface on the shaft 147. The inner race is fixed on the shaft 147 by a lock nut 153 and lock washer 154 on the left side of the race and by a spacer 155** on the right side which abuts a shoulder on the shaft.

The outer race **152*c* abuts a cylindrical inner surface 152*e* of the bearing housing. An outer bearing cap 156 engages the left side of the outer race 152*c* and an inner bearing cap 157 engages the right side of the outer race. The outer bearing cap 156 includes an axially extending cylindrical sleeve 156*a* and a radially extending flange 156*b*. The sleeve 156*a* extends into the bearing housing and engages the outer race 152*c*. The inner bearing cap 157 also includes an axially extending cylindrical sleeve 157*a* and a radially extending flange 157*b*. The sleeve 157*a* extends into the bearing housing and engages the outer race 152*c***.

The outer bearing cap 156, outer race **152*c*, and inner bearing cap 157 are clamped together by bolts (not shown) which extend through clearance openings in the flange 156*b* and through clearance openings in the bearing housing and are threaded into the flange 157*b***. The bolts ensure that the outer bearing cap, outer race, and inner bearing cap move axially together either to the right or to the left.

A plurality of first adjusting bolts 158 are screwed into threaded openings in the flange **156*b* of the outer bearing cap. Each bolt includes a square head 158*a* and a lock nut 158*b***. The bolt extends to bear against the left side surface of the bearing housing.

A plurality of second adjusting bolts 159 extends through clearance openings in the flange **156*b* and are screwed into threaded openings in the bearing housing. Bolt heads 159*a* engage the left face of the flange 156*b***.

The pivoted embossing roll 95 is shown in its leftmost position in FIG. 9. The flange **156*b* of the outer bearing cap 156 is spaced axially from the left face of the bearing housing by a dimension A. The flange 157*b* of the inner bearing cap 157 engages the right side surface of the bearing housing. The left end of the embossing roll 95 is held in a fixed axial position by the bearing housing 152***a* and the inner and outer races 152*b* and 152*c*. The bearing housing is fixed to the pivot arm 96 of the frame, and the outer race is prevented from moving axially by the inner and outer bearing caps 156 and 157 which are held in position on the bearing housing by the adjusting bolts 158 and 159. The inner race is prevented from moving axially with respect to the outer race by the bearings 152*d*. Since the shaft 147 is fixed with respect to the inner race, the left end of the shaft is fixed axially.

When it is desired to move the embossing roll 95 axially to the right, the first adjusting bolts 158 are unscrewed from the flange 157*b* to back ends of the bolts away from the left face of the bearing housing. The second adjusting bolts 159 are then screwed into the bearing housing to move the flange 157*b* of the outer bearing cap to the right toward the bearing housing by the desired amount of axial movement. The flange 157*b* can be moved axially to the right until it engages the left side surface of the bearing housing. As the outer bearing cap moves to the right, the cylindrical sleeve 157*a* of the cap slides the outer race 152*c* axially along the inside surface 152*e* of the bearing housing and moves the inner bearing cap 156 to the right. The inner race moves with the outer race and moves the shaft 147 and the embossing roll 95 axially to the right.

When the axial position of the embossing roll 95 has been adjusted as desired, the adjusting bolts 158 are tightened and locked by locking nuts 158*b* to fix the position of the roll.

When it is desired to move the embossing roll 95 axially to the left, the reverse procedure is followed. The second adjusting bolts 159 are unscrewed from the bearing housing. The first adjusting bolts 158 are then rotated to move the outer bearing cap 157 axially to the left by the desired amount of axial movement. Since the outer bearing cap, the outer race, and the inner bearing cap 156 are clamped together, the outer race and the inner bearing cap move axially to the left with the outer bearing cap. Axial movement of the outer race causes corresponding axial movement of the inner race and the embossing roll 95. The second adjusting bolts 159 are then tightened to fix the position of the roll.

Figure 10:
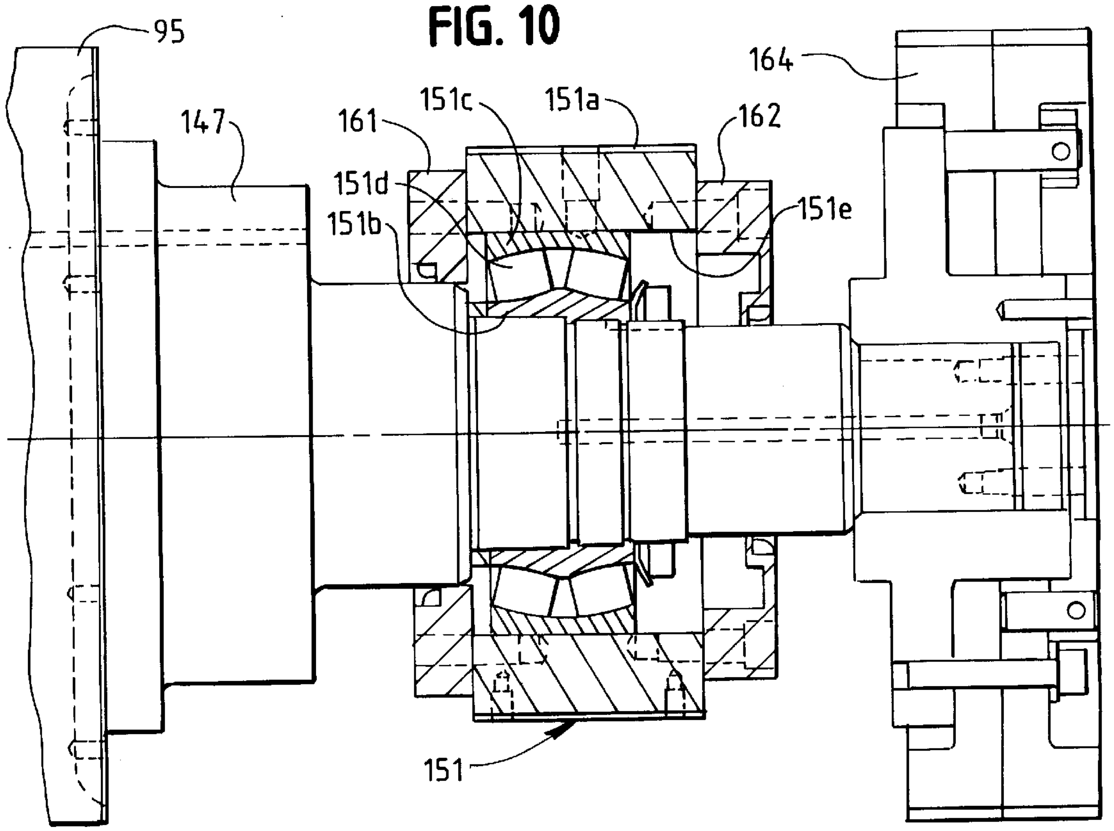
FIG. 10 is an enlarged fragmentary view of the right bearing assembly of the pivoting embossing roll.

FIG. 10 illustrates the structure of the right bearing assembly 151 which permits axial movement of the right end of the shaft 147. The bearing assembly includes a bearing housing 151*a*, inner and outer races 151*b* and 151*c*, and bearings 151*d*. The bearing housing is secured to the pivot arm 96.

The inner race 151*b* is fixed axially on the shaft 147 in the same way as the inner race of the left bearing assembly. The outer race 151*c* is slidably engaged with a cylindrical inside surface 151*e* of the bearing housing so that the outer race of the right bearing assembly moves axially as the outer race of the left bearing assembly is adjusted. The outer race 151*c* is retained within the cylindrical bore of the bearing housing by inner and outer bearing caps 161 and 162 which are bolted to the bearing housing.

Prior embossing machines have included the capability of limited axial adjustment in order to fine tune the relative positions of the two embossing rolls. However, prior embossing machines did not have the capability of sufficient axial adjustment which would permit the embossing machine to be changed from either foot-to-foot embossing or nested embossing to the other embossing mode without changing the embossing rolls.

The patterns which are described in the aforementioned patent application entitled "TWO-PLY PAPER PRODUCTS WITH EITHER NESTED OR FOOT-TO-FOOT EMBOSSMENTS AND METHOD OF MAKING" may require up to 1.25 inch or more of axial adjustment of the embossing rolls in order to change from one mode of embossing to the other. The axial adjustment mechanism of this invention permits axial adjustment up to the dimension A of FIG. 9. In the specific embodiment illustrated, that dimension is 1.264 inch. However, the dimension A could be increased or decreased as desired. For example, axial adjustment of from about 1 inch up to about 2 inches or more is within the capability of this invention.

A gear 164 is mounted on the right end of the shaft 147 for engagement with the gear 138 on the fixed embossing roll. The gear is secured to a hub 165 which is mounted on the shaft for rotation therewith. The hub engages a shoulder 166 on the shaft, and an end cap 167 is bolted to the end of the shaft.

Figure 12:
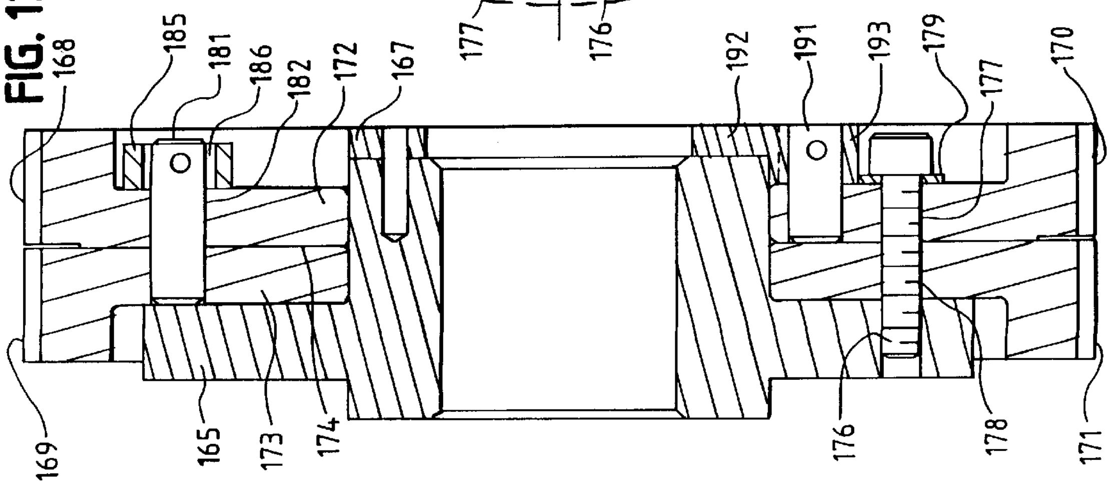
FIG. 12 is a sectional view taken along the line 12—12 of FIG. 11.

Referring to FIG. 12, the gear 164 is a split face gear which is formed from two gear halves or portions 168 and 169. The two gear halves include gear teeth 170 and 171 and radially inwardly extending annular flanges 172 and 173, respectively. The flanges extend perpendicularly to the rotational axis 150 and abut along transverse planar faces 174.

Figure 11:
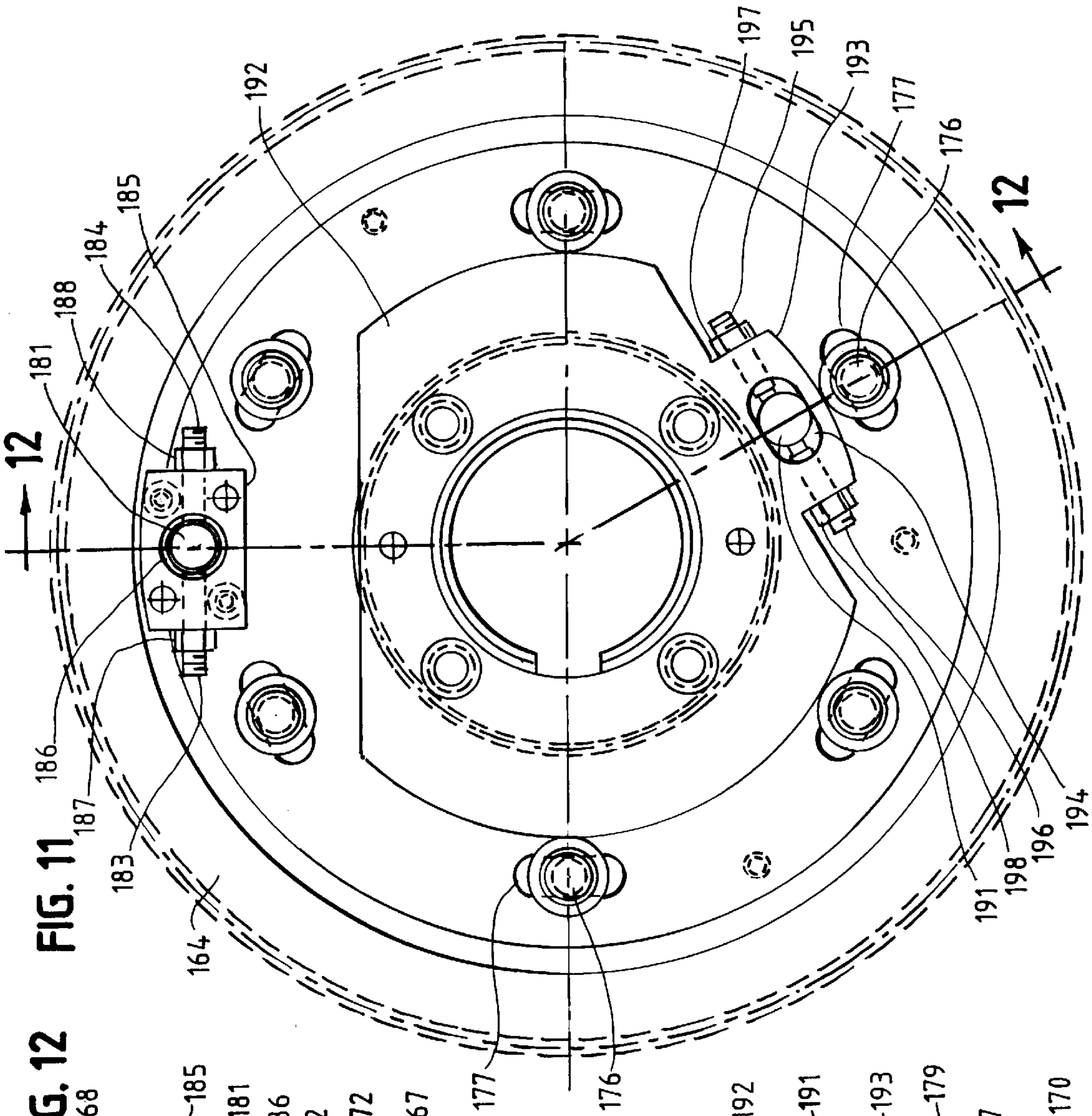
FIG. 11 is an enlarged end view of the gear for the pivoting embossing roll of FIG. 8.

The two gear halves are clamped to the hub 165 by six locking bolts 176 (see also FIG. 11). Each bolt extends through oval openings 177 and 178 in the gear halves and is threadedly engaged with the hub 165. A lock washer 179 is interposed between the bolt head and the gear half 168.

The two gear halves can be fanned, i.e., rotated relative to each other, to adjust the backlash with the mating gear 138 on the fixed embossing roll. A backlash adjusting pin 181 is fixedly secured to the left gear half 169 and extends through an oversized opening 182 in the right gear half 168.

A pair of backlash adjusting screws 183 and 184 (FIG. 11) are mounted on the right gear half 168 by a mounting bracket 185 which has an opening 186 through which the pin 181 extends. The adjusting screws 183 and 184 are screwed into the mounting bracket 185 in opposite directions and engage the backlash adjusting pin 181 at diametrically opposed locations. Nuts 187 and 188 on the screws are tightened against the bracket to fix the positions of the screws.

When it is desired to adjust the backlash of the gears 138 and 164, the locking bolts 176 are loosened, and the adjusting screws 183 and 184 are rotated to move the adjusting pin 181 and the left gear half 169 in the desired direction relative to the right gear half 168. The oversized opening 182 in the right gear half is sized to permit sufficient movement of the pin 181 to accomplish backlash adjustment.

Backlash adjustment causes relative rotation of the gear teeth 170 and 171 on the two gear halves, thereby changing the effective width or pitch of the gear teeth on the gear 164 and adjusting the backlash between gear 164 and gear 138. After the backlash adjustment is completed, the nuts 187 and the locking bolts 176 are tightened to secure the gear halves to the hub 165.

Circumferential adjustment of the pivoting embossing roll 95 relative to the fixed embossing roll 94 is accomplished by a circumferential adjustment pin 191 (FIGS. 11 and 12) which is fixed to the right gear half 168. An annular flange 192 is attached to the hub and includes a radially extending tab portion 193 which surrounds the pin 191. The pin 191 extends into an arcuate slot 194 in the tab portion. Adjusting screws 195 and 196 are screwed into the tab portion in opposite directions and engage the adjusting pin 191 at diametrically opposed locations. Nuts 197 and 198 on the screws are tightened against the tab portion to fix the positions of the screws.

When it is desired to circumferentially adjust the embossing roll 95 relative to the embossing roll 94, the locking bolts 177 are loosened, and the adjusting screws are rotated to move the adjusting pin 191 in the desired direction by the desired amount. Both of the gear halves 168 and 169 move together because the backlash adjusting screws 183 and 184 remain fixed.

When it is desired to circumferentially adjust the embossing roll 95 relative to the embossing roll 94 by an amount which corresponds to more than the circumferential tooth-to-tooth dimension of the gear 164, the gear 164 can be moved out of meshing engagement with the gear 138 by pivoting the pivot arm 96. The circumferential adjusting pin 191 and adjusting screws 195 and 196 are used to fine tune the circumferential adjustment by an amount which is less than the circumferential tooth-to-tooth dimension. The embossing pattern on the embossing roll 95 can therefore be quickly and easily circumferentially adjusted to a precise position relative to the embossing pattern of the embossing roll 94.

Figure 13:
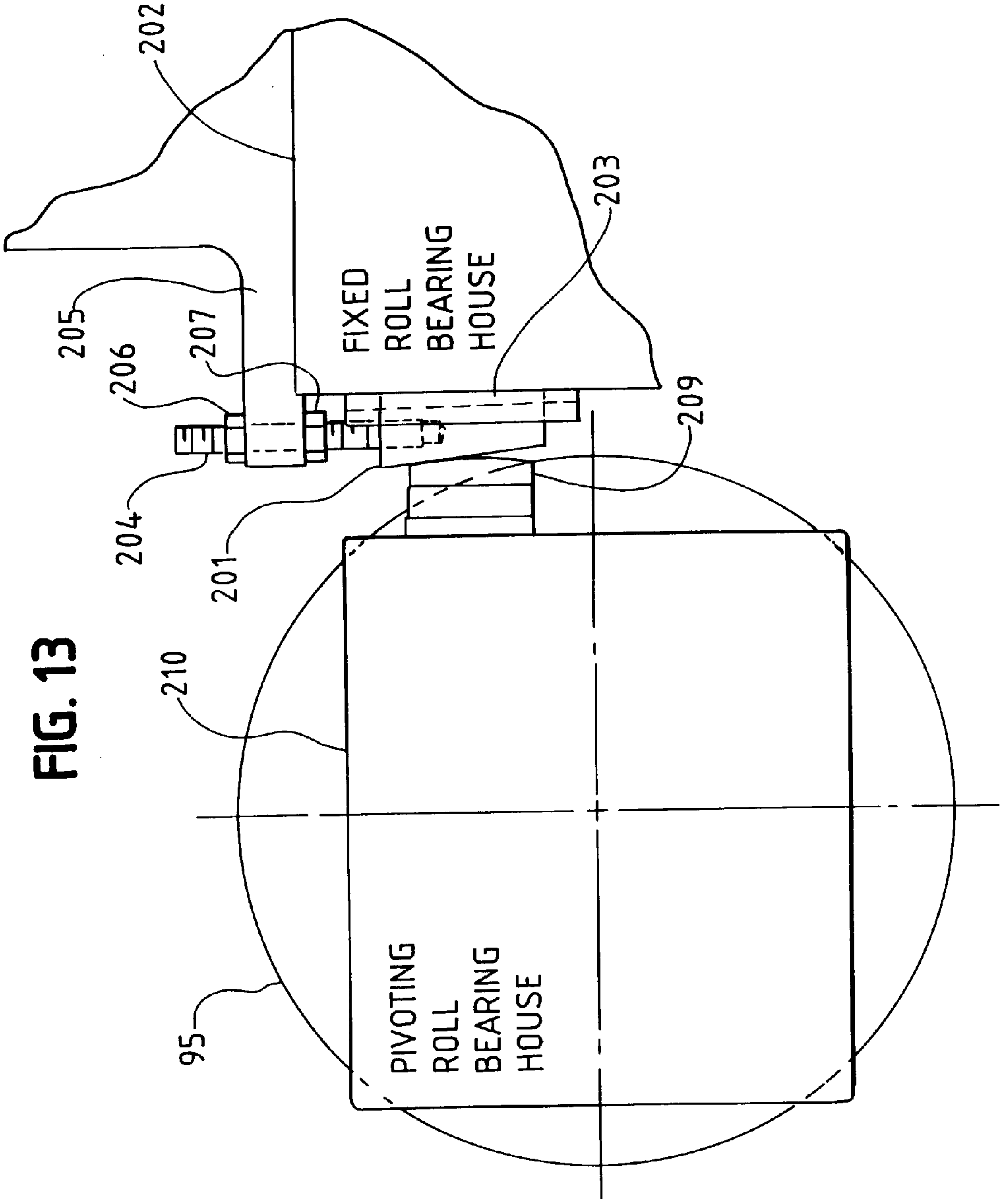
FIG. 13 illustrates the wedge stop adjustment between the two embossing rolls.

The gap between the two embossing rolls 94 and 95 can be precisely adjusted by the wedge stop adjustment mechanism which is illustrated in FIG. 13. A wedge 201 is slidably mounted on the bearing housing 202 for the fixed roll 94. The wedge is slidably mounted between two spaced-apart rails 203 on the bearing housing, and the position of the wedge 201 is adjusted by a screw 204 which is threaded through a support arm 205 on the bearing housing. The lower end of the screw is rotatably secured in a fixed position to the wedge 201. Nuts 206 and 207 on the screw can be tightened against the support arm 205 to fix the position of the screw. The wedge engages a stop 209 which is mounted on the bearing housing 210 for the pivoting roll 95. The stop 209 has a convex surface which engages the wedge 201.

The gap between the two embossing rolls can be changed by loosening the nuts 206 and 207 and rotating the screw 204 to move the wedge 201 in the desired direction. When the gap is changed, it may be desirable to make a backlash adjustment for the gears of the embossing rolls as previously described.

The combination embosser can produce both nested and foot-to-foot embossments with the same embossing rolls by engraving each of the embossing rolls with an engraving pattern in accordance with the aforementioned United States patent application entitled "TWO-PLY PAPER PRODUCTS WITH EITHER NESTED OR FOOT-TO-FOOT EMBOSSMENTS AND METHOD OF MAKING." The position of the pattern on the pivoting roll 95 relative to the pattern on the fixed roll 94 is selected for proper pattern alignment for either nested embossing or foot-to-foot embossing by adjusting the pivoting embossing roll 95 axially and/or circumferentially as previously described. The embossing mode can be changed simply by making another axial and/or circumferential adjustment. The embossing mode can therefore be changed quickly and easily without significant downtime or labor expense. When the embossing rolls are engraved with patterns in accordance with the aforementioned United States patent application, the embossing mode can be changed in less than two hours.

Since the position of the fixed roll 94 is not changed, it is not necessary to change the relative position of the incoming webs 108, 114, or 134, the rubber-covered rolls 92 and 93, or the adhesive applicator roll 112. It is also unnecessary to change the input drive connection to the fixed roll.

While in the foregoing specification, a detailed description of specific embodiments of the invention was set forth for the purpose of illustration, it will be understood that many of the details herein given can be varied considerably by those skilled in the art without departing from the spirit and scope of the invention.

We claim:

1. An embosser for embossing two webs of sheet material with either foot-to-foot or nested embossments comprising:

a frame, a first embossing roll having an embossed surface with embossments and an axially extending shaft, means for rotatably mounting the shaft of the first embossing roll in the frame, a second embossing roll having an embossed surface with embossments and an axially extending shaft, means for rotatably mounting the shaft of the second embossing roll in the frame, and means for adjusting the axial position of the second embossing roll for moving the second embossing roll between a first position in which the embossments on the first and second rolls are aligned for producing foot-to-foot embossments and a second position in which the embossments on the first and second rolls are nested for producing nested embossments.

2. The embosser of claim 1 in which the axial dimension between the first and second positions of the second embossing roll is at least about 1 inch.

3. The embosser of claim 1 in which the shaft of the second embossing roll includes first and second ends, the means for rotatably mounting the second embossing roll comprising first and second bearing assemblies for rotatably supporting the first and second ends of the shaft, each bearing assembly including a bearing housing, an inner race mounted on the shaft, and an outer race slidably mounted within the bearing housing, the means for adjusting the axial position of the second embossing roll being engageable with the outer race of one of the bearing assemblies for sliding the outer race within the bearing housing.

4. The embosser of claim 3 in which the bearing housing of said one bearing assembly has a pair of side surfaces, the means for adjusting the axial position of the second embossing roll including a first bearing cap which is mounted on the first side surface of the bearing housing for axial movement, the first bearing cap including a portion which engages the outer race of said one bearing assembly.

5. The embosser of claim 4 in which said portion of the first bearing cap is a sleeve which extends into the bearing housing.

6. The embosser of claim 4 including an adjusting bolt which is threadedly engaged with the first bearing cap and engages the bearing housing of said one bearing assembly.

7. The embosser of claim 5 including a second adjusting bolt which extends through the first bearing cap into said first side surface of the bearing housing the second adjusting bolt being threadedly engaged with the bearing housing.

8. The embosser of claim 7 in which the means for adjusting the axial position of the second embossing roll includes a second bearing cap which is mounted on said second side surface of the bearing housing for axial movement, the second bearing cap including a portion which engages the outer race of said one bearing.

9. The embosser of claim 8 in which said portion of the second bearing cap is a sleeve which extends into the bearing housing.

10. The embosser of claim 8 in which the outer race of said one bearing assembly is clamped between said first and second bearing caps.

11. The embosser of claim 4 in which the means for adjusting the axial position of the second embossing roll includes a second bearing cap which is mounted on said second side surface of the bearing housing for axial movement, the second bearing cap including a portion which engages the outer race of said one bearing.

12. The embosser of claim 11 in which said portion of the second bearing cap is a sleeve which extends into the bearing housing.

13. The embosser of claim 11 in which the outer race of said one bearing assembly is clamped between said first and second bearing caps.

14. The embosser of claim 4 including an adjusting bolt which extends through the first bearing cap into said first side surface of the bearing housing, the adjusting bolt being threadedly engaged with the bearing housing.

15. The embosser of claim 14 in which the means for adjusting the axial position of the second embossing roll includes a second bearing cap which is mounted on said second side surface of the bearing housing for axial movement, the second bearing cap including a portion which engages the outer race of said one bearing.

16. The embosser of claim 15 in which said portion of the second bearing cap is a sleeve which extends into the bearing housing.

17. The embosser of claim 15 in which the outer race of said one bearing assembly is clamped between said first and second bearing caps.

* * * * *